(12) United States Patent
Kamiya

(10) Patent No.: US 9,262,113 B2
(45) Date of Patent: Feb. 16, 2016

(54) IMAGE FORMING APPARATUS, IMAGE FORMING SYSTEM, AND NON-TRANSITORY COMPUTER-READABLE MEDIUM

(71) Applicant: FUJI XEROX CO., LTD., Minato-ku, Tokyo (JP)

(72) Inventor: Satoshi Kamiya, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/485,123

(22) Filed: Sep. 12, 2014

(65) Prior Publication Data

US 2015/0212768 A1    Jul. 30, 2015

(30) Foreign Application Priority Data

Jan. 30, 2014    (JP) ................. 2014-016116

(51) Int. Cl.
*G06F 15/00* (2006.01)
*G06F 3/12* (2006.01)

(52) U.S. Cl.
CPC ............ *G06F 3/1285* (2013.01); *G06F 3/1205* (2013.01); *G06F 3/126* (2013.01); *G06F 3/1226* (2013.01); *G06F 3/1232* (2013.01)

(58) Field of Classification Search
CPC .......................... G06F 3/1288; G06F 3/1297
USPC ......................................... 358/1.15
See application file for complete search history.

(56) References Cited

U.S. PATENT DOCUMENTS

| 2007/0279655 | A1  | 12/2007 | Murakawa |
| 2010/0220350 | A1* | 9/2010 | Faridi ............ H04L 41/026 358/1.15 |
| 2012/0311311 | A1  | 12/2012 | Asahara |
| 2012/0320415 | A1  | 12/2012 | Nakamura |
| 2012/0327442 | A1  | 12/2012 | Nakahara |

FOREIGN PATENT DOCUMENTS

| JP | 2007-329572 A | 12/2007 |
| JP | 2012250370 A  | 12/2012 |
| JP | 2013-1044 A   | 1/2013 |
| JP | 2013-9279 A   | 1/2013 |

* cited by examiner

*Primary Examiner* — Saeid Ebrahimi Dehkordy
(74) *Attorney, Agent, or Firm* — Sughrue Mion, PLLC

(57) ABSTRACT

An image forming apparatus includes a selection-information acquiring unit, a type-information acquiring unit, and a selecting unit. The selection-information acquiring unit acquires selection information including information representing an additional apparatus which is selectable in accordance with a combination of one or more types of additional apparatuses connectable to the image forming apparatus. The type-information acquiring unit acquires type information representing one or more types of connecting additional apparatuses which are the additional apparatuses connected to the image forming apparatus. The selecting unit selects a connecting additional apparatus corresponding to the type information from the selection information.

7 Claims, 10 Drawing Sheets

FIG. 5

| CONNECTED ADDITIONAL APPARATUS | ADDITIONAL APPARATUS FROM WHICH RECORDING MEDIUM IS DISCHARGED | OUTPUT DESTINATION THROUGH WHICH RECORDING MEDIUM IS DISCHARGED |
|---|---|---|
| A | A | A1 |
| B | B | B3 |
| C | C | C1 |
| A + B | B | B1 |
| A + C | C | C1 |
| B + C | C | C1 |
| A + B + C | C | C1 |

FIG. 6

| ITEM | | SETTING VALUE |
|---|---|---|
| APPARATUS BODY | COLOR | COLOR PRINTING |
| | SCALING | 100% |
| | SHEET TYPE | A4 |
| | SINGLE-SIDED/ DOUBLE-SIDED | DOUBLE-SIDED |
| | PAGES PER SHEET | 2 IN 1 |
| ADDITIONAL APPARATUS C | TRIMMING SIDE IN BOOKBINDING | THREE-KNIFE TRIMMING |
| OUTPUT DESTINATION | | C1 |

FIG. 9

| ITEM | | SETTING VALUE |
|---|---|---|
| APPARATUS BODY | COLOR | COLOR PRINTING |
| | SCALING | 100% |
| | SHEET TYPE | A4 |
| | SINGLE-SIDED/ DOUBLE-SIDED | DOUBLE-SIDED |
| | PAGES PER SHEET | 2 IN 1 |
| ADDITIONAL APPARATUS B | STAPLING | UPPER LEFT |
| | PUNCHING | TWO PUNCHES |
| | FOLDING | TRI-FOLD |
| | BOOKBINDING | SADDLE STITCH |
| ADDITIONAL APPARATUS C | TRIMMING SIDE IN BOOKBINDING | THREE-KNIFE TRIMMING |
| OUTPUT DESTINATION | | C1 |

FIG. 11

| ITEM | | SETTING VALUE |
|---|---|---|
| APPARATUS BODY | COLOR | COLOR PRINTING |
| | SCALING | 100% |
| | SHEET TYPE | A4 |
| | SINGLE-SIDED/ DOUBLE-SIDED | DOUBLE-SIDED |
| | PAGES PER SHEET | 2 IN 1 |
| ADDITIONAL APPARATUS B | STAPLING | UPPER LEFT |
| | PUNCHING | TWO PUNCHES |
| | FOLDING | TRI-FOLD |
| | BOOKBINDING | SADDLE STITCH |
| OUTPUT DESTINATION | | B3 |

IMAGE FORMING APPARATUS, IMAGE FORMING SYSTEM, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-016116 filed Jan. 30, 2014.

BACKGROUND

Technical Field

The present invention relates to an image forming apparatus, an image forming system, and a non-transitory computer-readable medium.

SUMMARY

According to an aspect of the invention, there is provided an image forming apparatus including a selection-information acquiring unit, a type-information acquiring unit, and a selecting unit. The selection-information acquiring unit acquires selection information including information representing an additional apparatus which is selectable in accordance with a combination of one or more types of additional apparatuses connectable to the image forming apparatus. The type-information acquiring unit acquires type information representing one or more types of connecting additional apparatuses which are the additional apparatuses connected to the image forming apparatus. The selecting unit selects a connecting additional apparatus corresponding to the type information from the selection information.

BRIEF DESCRIPTION OF THE DRAWINGS

Exemplary embodiments of the present invention will be described in detail based on the following figures, wherein:

FIG. 5 is a diagram illustrating exemplary selection information;

FIG. 6 is a diagram illustrating an exemplary setting result of the image forming apparatus;

FIG. 9 is a diagram illustrating an exemplary setting result of the image forming apparatus;

FIG. 11 is a diagram illustrating an exemplary setting result of the image forming apparatus.

DETAILED DESCRIPTION

Figure 1:
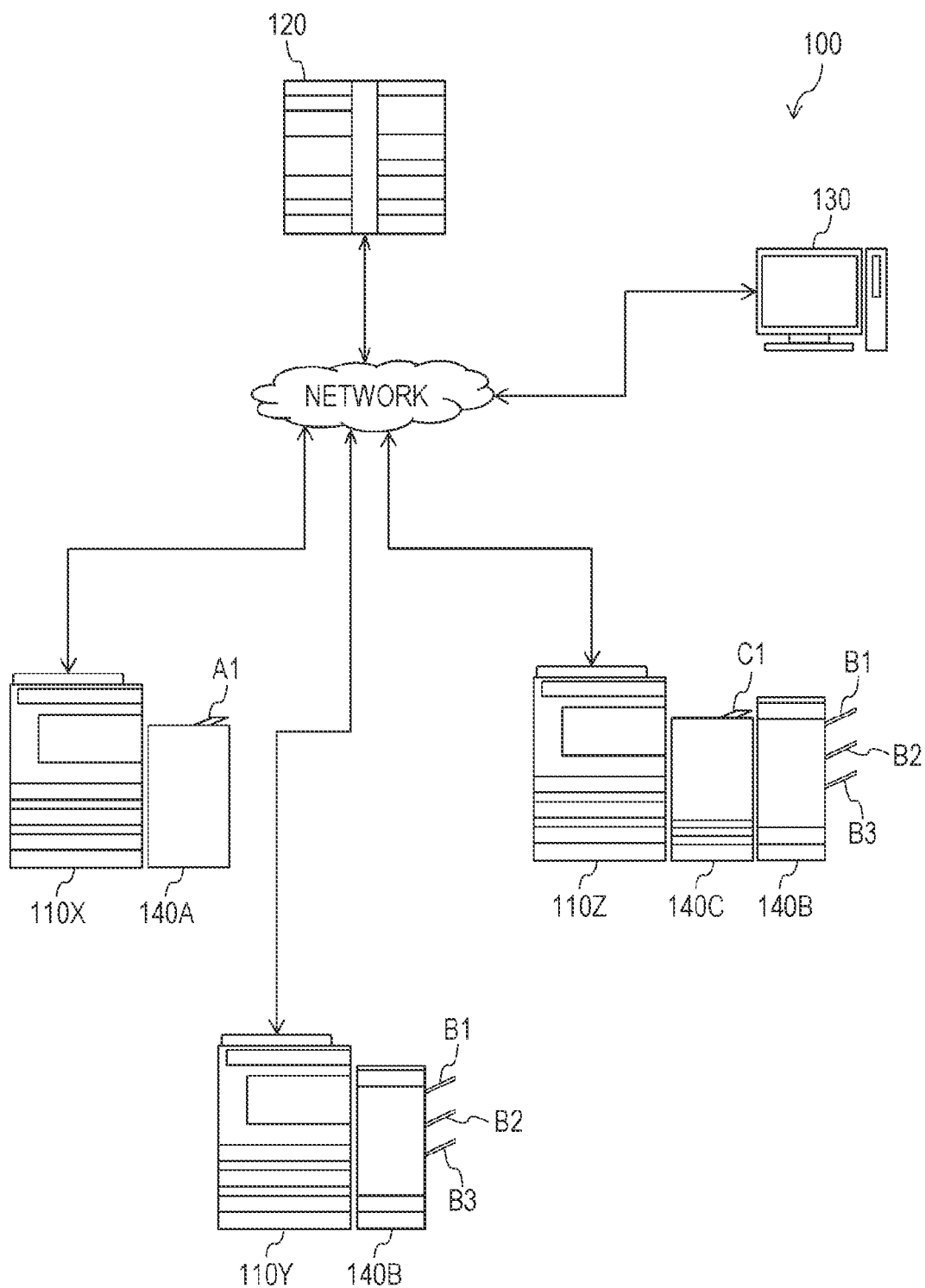
FIG. 1 is a diagram illustrating an exemplary configuration of an image forming system according to an exemplary embodiment of the present invention.

Exemplary embodiments of the present invention will be described below with reference to the drawings. In the drawings, the same or similar components are designated with identical reference characters, and repeated description will be avoided.

First Exemplary Embodiment

FIG. 1 is a diagram for describing an overview of the configuration of an image forming system according to a first exemplary embodiment of the present invention. An image forming system 100 includes at least one image forming apparatus 110, a server 120, a terminal 130, and at least one additional apparatus 140. The image forming apparatus 110, the server 120, and the terminal 130 are connected to each other via a network. The additional apparatus 140 is connected to the image forming apparatus 110. FIG. 1 illustrates an example. In the example, additional apparatuses 140A of type A, additional apparatuses 140B of type B, and additional apparatuses 140C of type C are used; an additional apparatus 140A of type A is connected to an image forming apparatus 110X; an additional apparatus 140B of type B is connected to an image forming apparatus 110Y; and both of an additional apparatus 140B of type B and an additional apparatus 140C of type C are connected to an image forming apparatus 1102. The types of the image forming apparatuses 110 and the additional apparatuses 140 included in the image forming system 100 according to the first exemplary embodiment of the present invention, the number of these apparatuses, and/or the combinations of these apparatuses are not limited to this, and may be different from those illustrated in FIG. 1.

An image forming apparatus 110 is, for example, a laser printer which forms an image on paper or the like which is a recording medium.

An additional apparatus 140 is, for example, a finishing apparatus having a function of performing a finishing process on paper or the like which is a recording medium on which the image forming apparatus 110 forms an image, and discharging the paper or the like. In the first exemplary embodiment, an additional apparatus 140A of type A is a finishing apparatus, called a large capacity stacker, that performs a finishing process, for example, of accumulatively sorting sheets of paper on which images are formed while sets of the sorted sheets are offset and that includes an output destination A1 as an output tray for paper. An additional apparatus 140B of type B is a finishing apparatus, called a saddle stitch finisher, that performs finishing processes, such as stapling, punching, folding, and bookbinding, and that includes an output destination B1, an output destination B2, and an output destination B3 as an output tray for paper. An additional apparatus 140C of type C is a finishing apparatus, called a case binding finisher, that performs a finishing process, for example, of performing bookbinding and then performing trimming after the bookbinding, and that includes an output destination C1 as an output tray for paper.

The terminal 130 is an information terminal, such as a personal computer (PC), for transmitting setting values for the image forming apparatuses 110 or the additional apparatuses 140 in the image forming system 100.

The server 120 is an apparatus that obtains and stores the setting values for the image forming apparatuses 110 or the additional apparatuses 140 which are transmitted from the terminal 130 and that transmits the setting values via the network to each of the image forming apparatuses 110.

Figure 2:
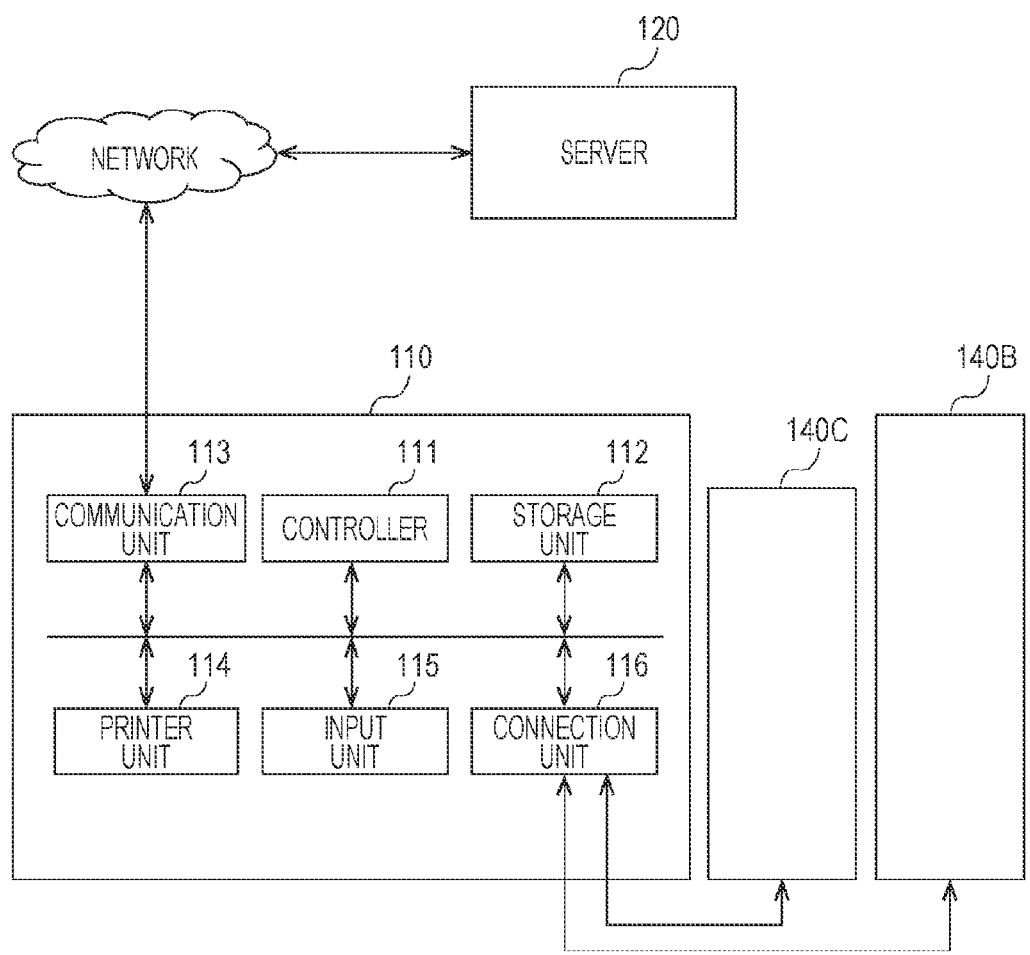
FIG. 2 is a diagram illustrating an exemplary hardware configuration of an image forming apparatus.

The image forming apparatus 110 will be described in detail. FIG. 2 is a diagram illustrating an exemplary hardware configuration of the image forming apparatus 110. The image forming apparatus 110 includes a controller 111, a storage unit 112, a communication unit 113, a printer unit 114, an input unit 115, and a connection unit 116.

The controller 111 which is a central processing unit (CPU) or the like operates in accordance with programs stored in the storage unit 112, and performs processes achieved by the image forming apparatus 110. The storage unit 112 is an information recording medium which is constituted by an information recording medium, such as a random-access memory (RAM), a read-only memory (ROM), a nonvolatile random-access memory (NVRAM), or a hard disk, and which stores the programs performed by the controller 111. The communication unit 113 which is a network interface receives/transmits information via the network. The printer unit 114 forms an image, for example, on a recording medium such as paper by using an electrophotographic system or the like. The input unit 115 which is a user interface receiving a user instruction is constituted by, for example, a keyboard and buttons. The connection unit 116 which is a hardware interface for establishing a connection to an additional apparatus 140 is connected to a connection unit (not illustrated) of the additional apparatus 140 so as to perform information communication between the image forming apparatus 110 and the additional apparatus 140. The programs performed by the controller 111 may be provided through a computer-readable information storage medium, such as an optical disk, a magnetic disk, a magnetic tape, a magneto-optical disk, or a flash memory, or may be provided through a communication unit such as the Internet.

Figure 3:
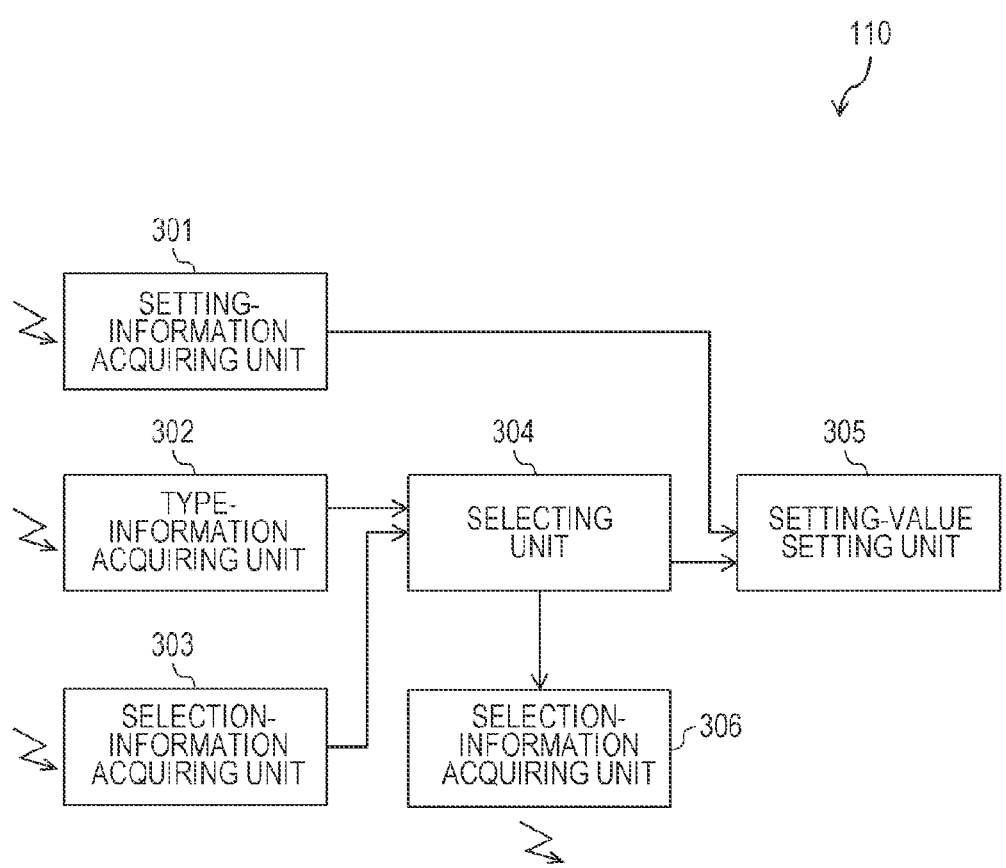
FIG. 3 is a diagram illustrating exemplary functions implemented in the image forming apparatus.

Functions achieved by the image forming apparatus 110 will be described. FIG. 3 is a diagram illustrating exemplary functions achieved by the image forming apparatus 110. As illustrated in FIG. 3, from the viewpoint of functional aspects, the image forming apparatus 110 includes a setting-information acquiring unit 301, a type-information acquiring unit 302, a selection-information acquiring unit 303, a selecting unit 304, a setting-value setting unit 305, and a setting-information request unit 306.

The description will be made below by taking, as an example, a case in which an additional apparatus 140B of type B and an additional apparatus 140C of type C are connected to an image forming apparatus 110 as illustrated in FIG. 2.

Figure 4:
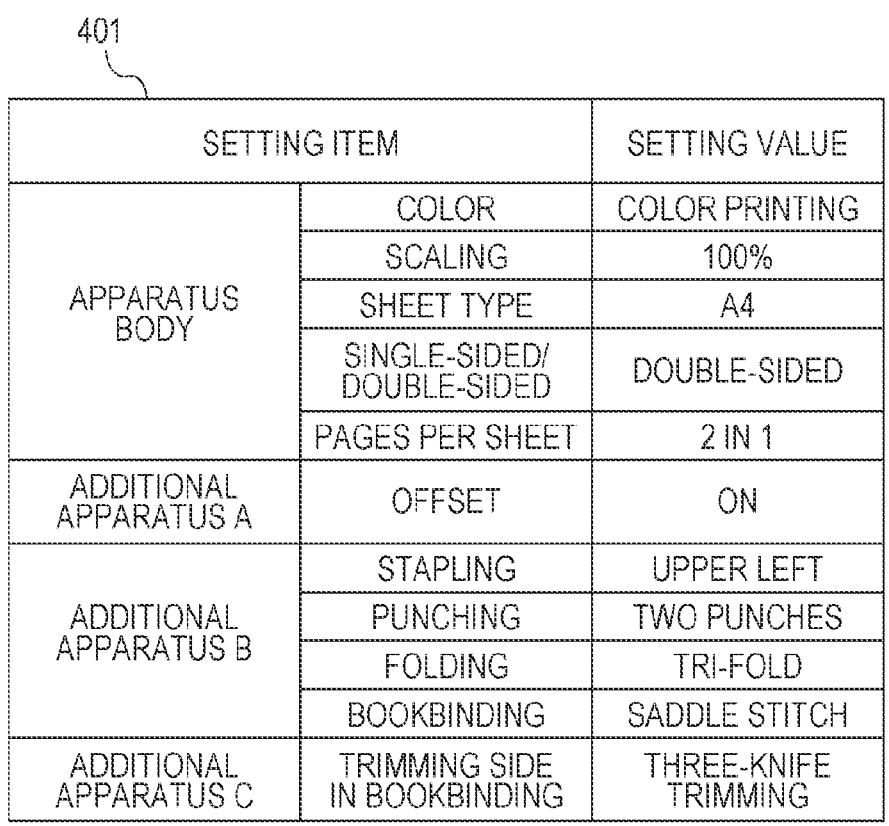
FIG. 4 is a diagram illustrating exemplary setting information.

The setting-information acquiring unit 301 acquires, from the server 120, setting information which is transmitted from the terminal 130 and stored in the server 120 so as to set the image forming apparatus 110 or the additional apparatuses 140. The setting information is information containing setting values for the image forming apparatus 110 and the additional apparatuses 140 which are included in the image forming system 100. FIG. 4 is a diagram illustrating exemplary setting information. As illustrated in FIG. 4, setting information 401 contains setting values for setting items of the apparatus body of the image forming apparatus 110, setting values for setting items of the additional apparatus 140A of type A, setting values for setting items of the additional apparatus 140B of type B, and setting values for setting items of the additional apparatus 140C of type C.

The setting items of the apparatus body in the setting information 401 are common to the image forming apparatuses 110 even when the types of the apparatus bodies of the image forming apparatuses 110 are different. The setting items are, for example, those of the "color", the "scaling", the "sheet type", the "single-sided/double-sided", and the "pages per sheet". The setting items of the additional apparatuses 140 in the setting information 401 are specified for each of the additional apparatuses so as to correspond to the respective functions of the additional apparatuses 140. The setting values specified in the setting information 401 are so-called initial setting values employed when a user who uses the image forming apparatus 110 and the additional apparatuses 140 does not particularly specify other setting values. The setting information 401 may contain setting values for the image forming apparatus 110 and all of the models of the additional apparatuses 140 included in the image forming system 100, or may contain setting values for some of the models. The setting information 401 may contain setting values only for the image forming apparatus 110 or only for the additional apparatuses 140.

The type-information acquiring unit 302 acquires type information representing the type of an additional apparatus 140 connected to the image forming apparatus 110, via the connection unit 116 from the additional apparatus 140. The type information is, for example, a model code, and is information for uniquely identifying the model of an additional apparatus 140. The type information is stored, for example, in a storage unit (not illustrated) included in the additional apparatus 140.

The selection-information acquiring unit 303 acquires selection information. The selection information is information specifying the type and an output destination of an additional apparatus 140 selectable in accordance with the combination of the types of additional apparatuses 140 connected to the image forming apparatus 110. FIG. 5 is a diagram illustrating exemplary selection information. For example, as illustrated in FIG. 5, selection information 501 specifies an additional apparatus 140 from which a recording medium is discharged in accordance with the connected additional apparatuses 140, and also specifies an output destination of the additional apparatus 140 through which the recording medium is discharged. The selection information 501 is stored in the storage unit 112 included in the image forming apparatus 110.

The selecting unit 304 refers to the selection information 501 on the basis of the type information acquired by the type-information acquiring unit 302, and selects an additional apparatus 140 in accordance with the combination of the types of additional apparatuses 140 connected to the image forming apparatus 110, and an output destination of the additional apparatus 140. For example, when the acquired types of additional apparatuses 140 are B and C, the additional apparatus 140C of type C is selected as an additional apparatus from which a recording medium is discharged, and the output destination C1 is selected as an output destination through which a recording medium is discharged.

The setting-value setting unit 305 sets the image forming apparatus 110 and the selected additional apparatus 140 on the basis of the setting values specified in the setting information 401. FIG. 6 is a diagram illustrating a setting result of the setting values for the image forming apparatus 110 to which the additional apparatus 140B of type B and the additional apparatus 140C of type C are connected. As illustrated in FIG. 6, for items of the "color", the "scaling", the "sheet type", the "single-sided/double-sided", and the "pages per sheet", which correspond to the settings for the apparatus body of the image forming apparatus 110, the setting values for the corresponding items in the setting information 401 are employed: color printing is set to the item of the "color"; 100%, to the item of the "scaling"; A4, to the item of the "sheet type"; "double-sided", to the item of the "single-sided/double-sided"; and "2 in 1", to the item of the "pages per sheet". Similarly, three-knife trimming is set to the item of the "trimming side in bookbinding" which corresponds to the setting of the selected additional apparatus 140C of type C. The output destination C1 selected by the selecting unit 304 is set as the output destination.

When the setting values for the image forming apparatus 110 or the additional apparatuses 140 are required, the setting-information request unit 306 requests the setting values from the server 120. An example will be described in a third exemplary embodiment.

Figure 7:
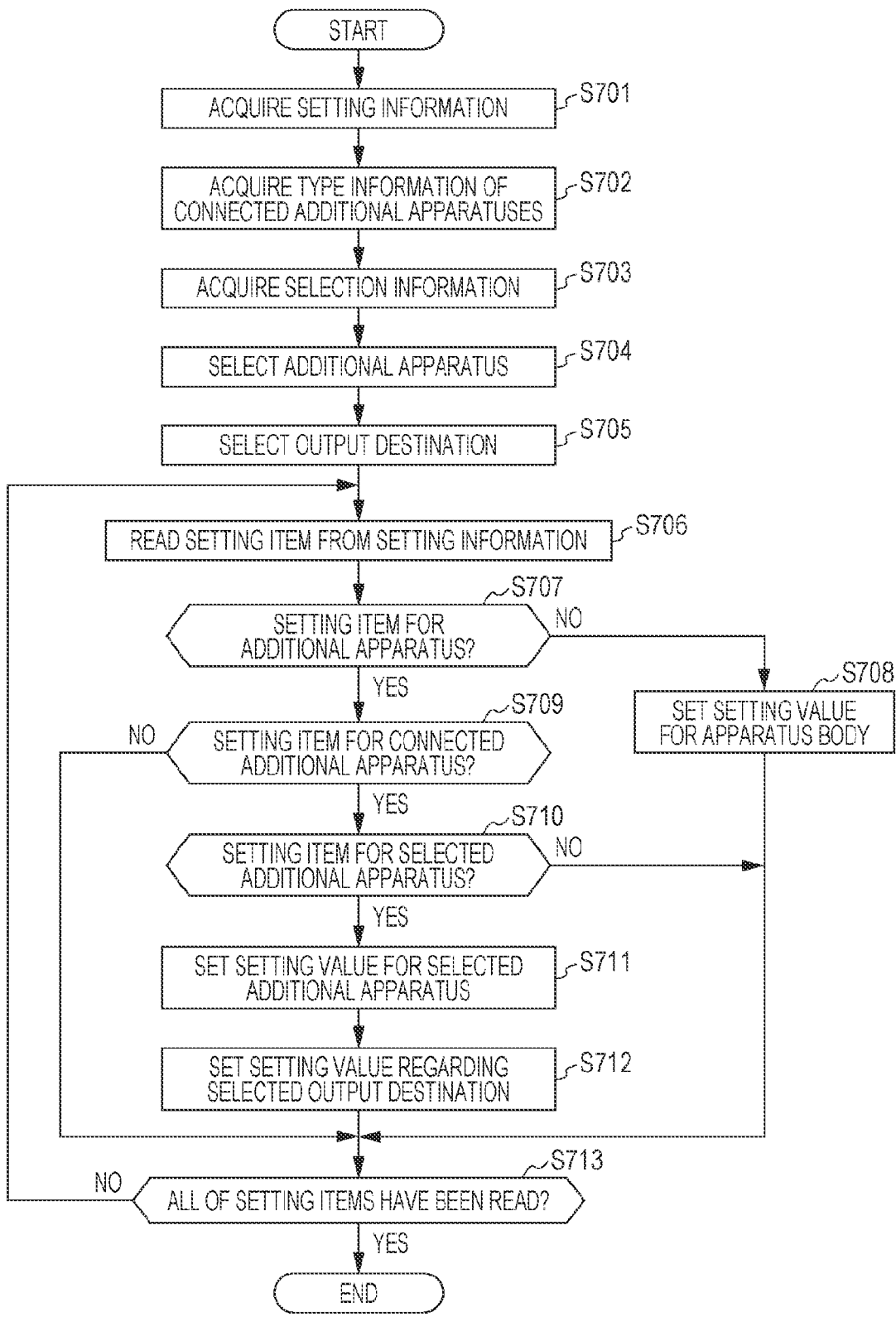
FIG. 7 is a diagram illustrating an exemplary process flow of the image forming apparatus.

An overview of the process flow of the image forming apparatus 110 according to the first exemplary embodiment will be described. FIG. 7 is a diagram illustrating an exemplary process flow of the image forming apparatus 110 according to the first exemplary embodiment. Specifically, FIG. 7 illustrates the exemplary process flow from the time point at which the image forming apparatus 110 obtains the setting information 401 to the time point at which the image forming apparatus 110 ends the setting of the image forming apparatus 110 and the additional apparatuses 140.

As illustrated in FIG. 7, the setting-information acquiring unit 301 acquires the setting information 401 transmitted from the terminal 130, from the server 120 (in step S701). The type-information acquiring unit 302 acquires type information of the additional apparatuses 140 connected to the image forming apparatus 110 (in step S702), and the selection-information acquiring unit 303 acquires the selection information 501 (in step S703). The selecting unit 304 selects an additional apparatus 140 according to the combination of the types of the additional apparatuses 140 connected to the image forming apparatus 110, on the basis of the type information and the selection information 501 (in step S704). The selecting unit 304 selects an output destination among the output destinations of the additional apparatus 140 selected in step S704 (in step S705).

The setting-value setting unit 305 sequentially reads setting items in the setting information 401 (in step S706), and determines whether the setting item which is read is a setting item of the apparatus body of the image forming apparatus 110, or a setting item of an additional apparatus 140 (in step S707). If the setting item is a setting item of the apparatus body of the image forming apparatus 110 (NO in step S707), the setting-value setting unit 305 sets a setting value for the setting item to the apparatus body of the image forming apparatus 110 (in step S708).

If the setting item is a setting item of an additional apparatus 140 (YES in step S707), the setting-value setting unit 305 determines whether or not the setting item is a setting item of an additional apparatus 140 connected to the image forming apparatus 110 (in step S709). If the setting item is a setting item of an additional apparatus 140 connected to the image forming apparatus 110 (YES in step S709), the setting-value setting unit 305 determines whether or not the setting item is a setting item of the additional apparatus selected in step S704 (in step S710). If the setting item is a setting item of the additional apparatus selected in step S704 (YES in step S710), the setting-value setting unit 305 sets a setting value specified for the setting item to the additional apparatus 140 selected in step S704 (in step S711). The setting-value setting unit 305 sets the setting value regarding the output destination selected in step S705 (in step S712).

If the process in step S708 or S712 ends, if the setting item is not a setting item of a connected additional apparatus (NO in step S709), or if the setting item is not a setting item of the selected additional apparatus 140 (NO in step S710), the setting-value setting unit 305 determines whether or not all of the setting items in the setting information 401 have been read (in step S713). If a next setting item is present (NO in step S713), the process in step S706 is performed. If all of the setting items have been read (YES in step S713), the process ends.

The image forming apparatus 110 according to the first exemplary embodiment achieves selection and setting of an additional apparatus 140 from which a recording medium is discharged, and selection and setting of an output destination of the additional apparatus 140, in accordance with the combination of the connected additional apparatuses 140. Therefore, even in the case where each of the connected additional apparatuses 140 includes an output destination or where one additional apparatus 140 includes multiple output destinations, a troublesome operation of selecting and setting one of the output destinations is not required. In addition, since setting values determined depending on the combination of the additional apparatuses 140 are set, a troublesome operation of individually setting image forming apparatuses 110 to which different additional apparatuses 140 are connected is not required.

Second Exemplary Embodiment

In the first exemplary embodiment, the case in which setting values for an additional apparatus 140 selected from the additional apparatuses 140 connected to the image forming apparatus 110 are set is described. In a second exemplary embodiment, a case in which setting values are set for all of the additional apparatuses 140 connected to the image forming apparatus 110 and the selected output destination will be described. The apparatus configuration in the image forming system according to the second exemplary embodiment is the same as that in the first exemplary embodiment, and will not be described. The process flow of the image forming apparatus 110 will be described by using a flowchart. Similarly to the case in the first exemplary embodiment, description will be made by taking, as an example, a case in which the additional apparatus 140B of type B and the additional apparatus 140C of type C are connected to the image forming apparatus 110.

Figure 8:
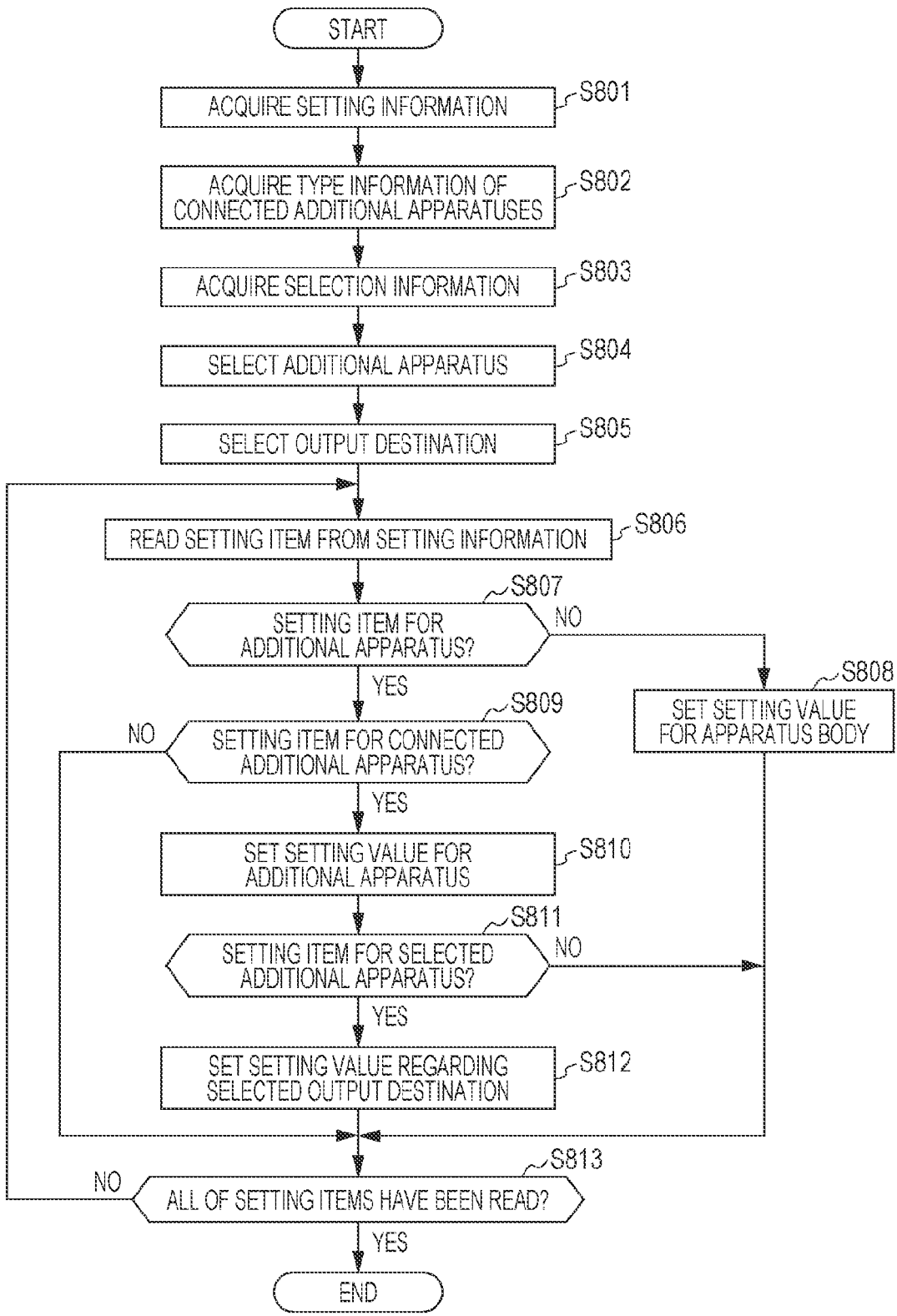
FIG. 8 is a diagram illustrating an exemplary process flow of the image forming apparatus.

FIG. 8 is a diagram illustrating an exemplary process flow of the image forming apparatus 110 according to the second exemplary embodiment. The processes in steps S801 to S809 are the same as those in steps S701 to S709 in the first exemplary embodiment, and will not be described.

If the setting item which is read in the process in step S806 is a setting item of a connected additional apparatus (YES in step S809), the setting-value setting unit 305 sets a setting value specified for the setting item to the additional apparatus 140 corresponding to the setting item (in step S810). The setting-value setting unit 305 determines whether or not the setting item is a setting item of the additional apparatus selected in step S804 (in step S811). If the setting item is a setting item of the additional apparatus selected in step S804 (YES in step S811), the setting-value setting unit 305 sets the setting value regarding the output destination selected in step S805 (in step S812).

If the process in step S808 or S812 ends, if the setting item is not a setting item of a connected additional apparatus (NO in step S809), or if the setting item is not a setting item of the selected additional apparatus 140 (NO in step S811), the setting-value setting unit 305 determines whether or not all of the setting items in the setting information 401 have been read (in step S813). If a next setting item is present (NO in step S813), the process in step S806 is performed. If all of the setting items have been read (YES in step S813), the process ends.

FIG. 9 is a diagram illustrating a setting result which is set through the above-described process. As illustrated in FIG. 9, for items of the "color", the "scaling", the "sheet type", the "single-sided/double-sided", and the "pages per sheet", which correspond to the settings for the apparatus body of the image forming apparatus 110, the setting values for the corresponding items in the setting information 401 are employed: color printing is set to the item of the "color"; 100%, to the item of the "scaling"; A4, to the item of the "sheet type"; "double-sided", to the item of the "single-sided/double-sided"; and "2 in 1", to the item of the "pages per sheet". Similarly, for items which correspond to the settings for the additional apparatus 140B of type B, upper left is set to the item of the "stapling"; two punches, to the item of the "punching"; "tri-fold", to the item of the "folding"; and saddle stitch, to the item of the "bookbinding". Similarly, three-knife trimming is set to the item of the "trimming side in bookbinding" which corresponds to the setting of the additional apparatus 140C of type C. The output destination C1 selected by the selecting unit 304 is set as the output destination.

Third Exemplary Embodiment

In the first and second exemplary embodiments, an aspect in which, in response to acquisition of the setting information 401, the image forming apparatus 110 sets setting values is described. In the third exemplary embodiment, an aspect in which, when the connected additional apparatuses 140 are changed after the setting values are set, the image forming apparatus 110 sets setting values for an additional apparatus 140 selected on the basis of the additional apparatuses 140 which have been changed will be described. The apparatus configuration in the image forming system according to the third exemplary embodiment is the same as that in the first and second exemplary embodiments, and will not be described. The process flow of the image forming apparatus 110 will be described by using a flowchart.

Description will be made by taking, as an example, a case in which the state of the additional apparatuses 140 connected to the image forming apparatus 110 are changed from a first state to a second state by removing the additional apparatus 140C of type C. The first state is similar to that in the first and second exemplary embodiments, that is, a state in which the additional apparatus 140B of type B and the additional apparatus 140C of type C are connected to the image forming apparatus 110. The second state is a state in which only the additional apparatus 140B of type B is connected to the image forming apparatus 110.

Figure 10:
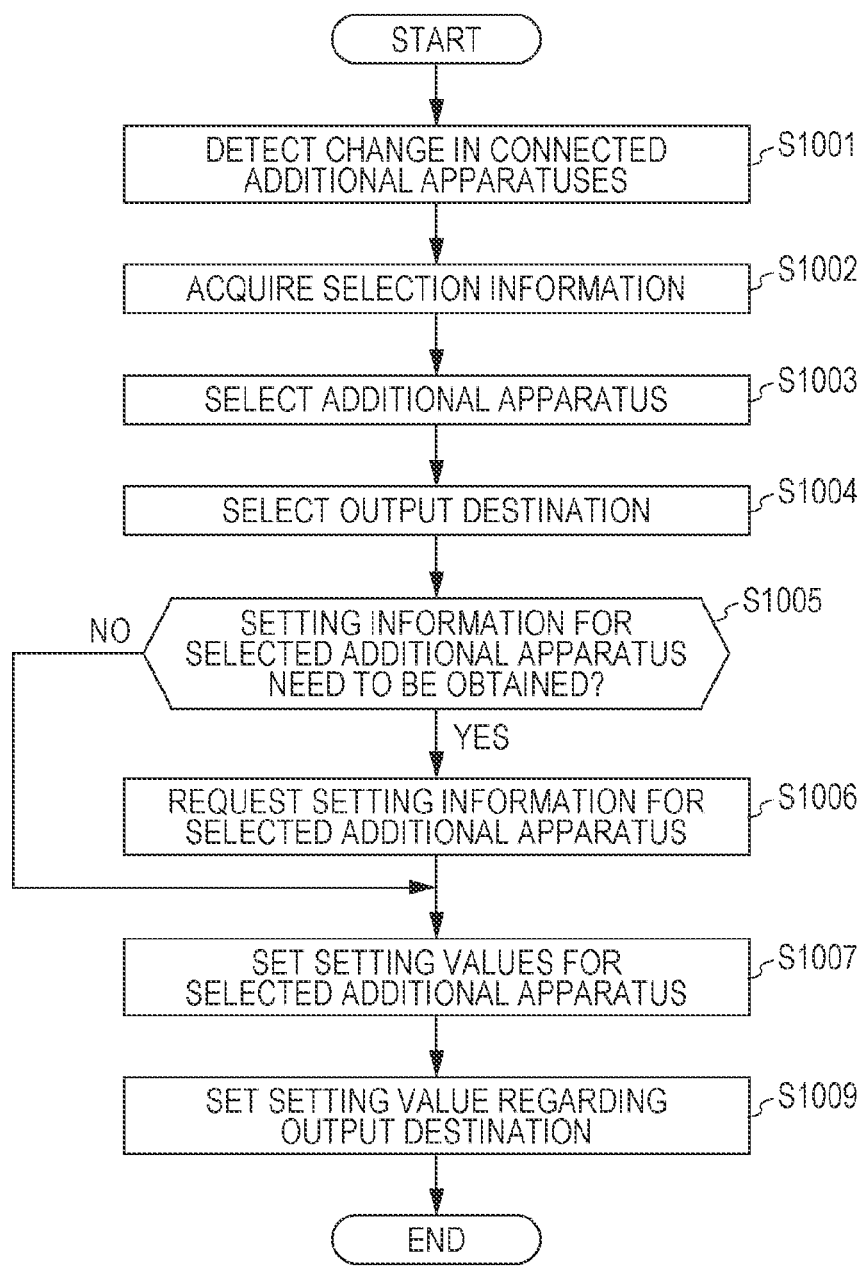
FIG. 10 is a diagram illustrating an exemplary process flow of the image forming apparatus.

FIG. 10 is a diagram illustrating an exemplary process flow in which, when the additional apparatuses 140 connected to the image forming apparatus 110 are changed, the image forming apparatus 110 sets setting values for an additional apparatus 140 selected on the basis of the changed additional apparatuses 140. In the image forming apparatus 110, when the type-information acquiring unit 302 detects a change in the connected additional apparatuses 140 through newly acquired type information which has been changed (in step S1001), the selection-information acquiring unit 303 acquires the selection information 501 (in step S1002). The selecting unit 304 selects an additional apparatus 140 according to the new combination of the types of the additional apparatuses 140, on the basis of the newly acquired type information and the selection information 501 (in step S1003). Further, the selecting unit 304 selects an output destination selected in accordance with the new combination of the types of the additional apparatuses 140 (in step S1004).

The setting-information request unit 306 determines whether or not the setting values for the selected additional apparatus 140 and the selected output destination need to be newly obtained (in step S1005). If the setting values for the selected additional apparatus 140 and the selected output destination need to be newly obtained (YES in step S1005), the setting-information request unit 306 requests the setting values from the server 120 (in step S1006). For example, if the setting values do not need to be newly obtained, for example, if the additional apparatus 140 and the selected output destination after the change are the same as those before the change (NO in step S1005), the process in step S1006 is skipped.

The setting-value setting unit 305 sets the setting values for the selected additional apparatus 140 (in step S1007). In addition, the setting-value setting unit 305 sets the setting value regarding the output destination selected in step S1004 (in step S1009). When the process in step S1009 ends, the process ends.

When only the additional apparatus 140B of type B is connected to the image forming apparatus 110, the additional apparatus 140B of type B and the output destination B3 are selected on the basis of the selection information 501. FIG. 11 is a diagram illustrating a setting result of settings made in the above-described process. As illustrated in FIG. 11, setting values for the additional apparatus 140B of type B and the output destination B3 selected after the change of the connected additional apparatuses 140 are set.

The present invention is not limited to the above-described exemplary embodiments. The configuration of the above-described exemplary embodiments may be replaced with a configuration which is substantially the same as the configuration of the above-described exemplary embodiments, a configuration which produces the same effect, or a configuration with which the same object may be achieved. For example, the functional configuration and the above-describe process flows of the image forming apparatus 110 are merely an example, and the present invention is not limited to this.

For example, the acquired setting information 401 may be stored in the storage unit 112 of the image forming apparatus 110. In this case, even when the connected additional apparatuses 140 are changed, the setting information 401 is not requested from the server 120. That is, even when the network connection is severed, setting values for the additional apparatus 140 selected after the change are set.

For example, similarly to the setting information 501, the selection information 401 may be obtained from the server 120.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a selection-information acquiring unit that acquires selection information including information representing an additional apparatus from additional apparatuses connected to the image forming apparatus;
   a type-information acquiring unit that acquires type information representing the connected additional apparatuses;
   a selecting unit that selects one of the connected additional apparatuses corresponding to the type information from the selection information; and a setting unit that reads a setting item in a setting information and determine if the setting item is for the image forming apparatus or for one of the connected additional apparatuses, wherein the setting item sets an output destination of an image to be formed.

2. The image forming apparatus according to claim 1, further comprising:

a setting-information acquiring unit that acquires the setting information which is information for the connected additional apparatuses, wherein the setting unit that sets a setting value for the selected additional apparatus using the setting information.

3. The image forming apparatus according to claim 2, wherein the selection information further includes information representing specification of the output destination for a medium on which an image is formed and that is selected in accordance with the connected additional apparatuses, and wherein the selecting unit further selects an output destination in accordance with the connected additional apparatuses.

4. The image forming apparatus according to claim 2, further comprising:

a request unit, wherein, the selecting unit, in response to connected additional apparatuses being changed, selects one of the connected additional apparatuses, and wherein the request unit requests the setting information for the selected one of the connected additional apparatuses which has been changed.

5. The image forming apparatus according to claim 1, wherein the selection information further includes information representing the output destination for a medium on which an image is formed and that is selected in accordance with the connected additional apparatuses, and wherein the selecting unit further selects an output destination in accordance with the connected additional apparatuses.

6. A non-transitory computer readable medium storing a program causing a computer to execute a process comprising:

acquiring selection information including information representing an additional apparatus from additional apparatuses connected to an image forming apparatus;

acquiring type information representing the connected additional apparatuses;

selecting a connected additional apparatus corresponding to the type information from the selection information; and reading a setting in the setting information and determining if the setting item is for the image forming apparatus or for one of the connected additional apparatuses, wherein the setting item sets an output destination of an image to be formed.

7. An image forming system comprising:

at least one image forming apparatus; and a server, wherein the server includes:

a setting-information storage that stores setting information from additional apparatuses connected to the at least one image forming apparatus, wherein the at least one image forming apparatus includes a selection-information acquiring unit that acquires selection information including information representing an additional apparatus which is selectable in accordance with the connected additional apparatuses, a type-information acquiring unit that acquires type information representing the connected additional apparatuses, a selecting unit that selects a connected additional apparatus corresponding to the type information from the selection information, a setting-information acquiring unit that acquires the setting information from the server, a setting unit that sets a setting value for the selected connected additional apparatus using the setting information; and a setting unit that reads a setting item in the setting information and determine if the setting item is for the image forming apparatus or for one of the additional apparatuses, wherein the setting item sets an output destination of an image to be formed.

\* \* \* \* \*